US010595370B2

(12) United States Patent
Mao et al.

(10) Patent No.: US 10,595,370 B2
(45) Date of Patent: Mar. 17, 2020

(54) LED LAMP AND DRIVER CIRCUIT FOR LED LIGHT SOURCE

(71) Applicant: Current Lighting Solutions, LLC, East Cleveland, OH (US)

(72) Inventors: Zhu Mao, Shanghai (CN); Bo Zhang, Shanghai (CN); Fanbin Wang, Shanghai (CN); Shuyi Qin, Shanghai (CN)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 15/958,735

(22) Filed: Apr. 20, 2018

(65) Prior Publication Data

US 2018/0343716 A1 Nov. 29, 2018

(30) Foreign Application Priority Data

May 25, 2017 (CN) .......................... 2017 1 0377966

(51) Int. Cl.
*H05B 33/08* (2020.01)
*H05B 33/06* (2006.01)

(52) U.S. Cl.
CPC ......... *H05B 33/0818* (2013.01); *H05B 33/06* (2013.01); *H05B 33/0809* (2013.01); *H05B 33/0842* (2013.01); *H05B 33/0851* (2013.01)

(58) Field of Classification Search
CPC .... H05B 33/02; H05B 33/08; H05B 33/0803; H05B 33/0806; H05B 33/0818;
(Continued)

(56) References Cited

U.S. PATENT DOCUMENTS 5,619,404 A * 4/1997 Zak ..................... H02M 1/4258 363/16
6,011,362 A * 1/2000 Moisin ................ H05B 41/295 315/225

(Continued)

FOREIGN PATENT DOCUMENTS

CN 106058888 A 10/2016

OTHER PUBLICATIONS

Office Action issued in connection with corresponding CN Application No. 201710377966.0 dated Aug. 15, 2019.

*Primary Examiner* — Jason Crawford
(74) *Attorney, Agent, or Firm* — Buckley, Maschoff & Talwalkar LLC

(57) ABSTRACT

The present invention discloses an LED lamp adapted to work in a circuit that contains a magnetic ballast. The LED lamp comprises a bridge rectifier, a filter capacitor, an LED light source, a transistor, and a pulse width modulation controller. The bridge rectifier is configured to convert the alternating current supplied by the magnetic ballast into a direct current. The bridge rectifier comprises a first input terminal, a second input terminal, a first output terminal, and a second output terminal, where the first and second input terminals are electrically connected to the magnetic ballast. The filter capacitor is electrically connected to the first and second output terminals of the bridge rectifier. The LED light source is electrically connected to the first and second output terminals of the bridge rectifier. The transistor comprises a drain electrode, a source electrode, and a gate electrode. The drain electrode and source electrode are electrically connected to the first and second output terminals of the bridge rectifier respectively. The pulse width modulation controller is electrically connected to the gate electrode of the transistor, and configured to control the turning on and off of the transistor. The present invention
(Continued)

30 310 313 D5 20 D1 D3 330 201 L1 311 351 350 10 C1 355 C2 312 353 R1 203 D2 D4 314 370 PWM further discloses a driver circuit that will enable an LED light source to function on the power supplied by a magnetic ballast.

7 Claims, 1 Drawing Sheet

(58) Field of Classification Search
CPC .......................... H05B 37/02; H05B 37/0209; H05B 37/0227; H05B 39/02; H05B 39/04; H05B 39/044; H05B 39/047
See application file for complete search history.

(56) References Cited

U.S. PATENT DOCUMENTS 6,445,600 B2 * 9/2002 Ben-Yaakov ....... H02M 1/4225 363/39
9,491,845 B2 * 11/2016 Melanson .......... H05B 33/0854
9,967,938 B2 * 5/2018 Chen .................. H05B 33/0851
2005/0213352 A1 * 9/2005 Lys ..................... H02M 1/4225 363/17
2008/0224636 A1 * 9/2008 Melanson .......... H05B 33/0815 315/307
2010/0213859 A1 * 8/2010 Shteynberg ........ H05B 33/0815 315/224
2010/0328946 A1 * 12/2010 Borkar .............. H05B 33/0845 362/249.02
2011/0291585 A1 * 12/2011 Foo .................... H05B 33/0815 315/291
2011/0292704 A1 * 12/2011 Makino .............. H02M 1/4208 363/126
2012/0161666 A1 * 6/2012 Antony ............. H05B 33/0809 315/294
2012/0268028 A1 * 10/2012 Kumada ............... H02H 9/002 315/226
2012/0306459 A1 * 12/2012 Ho ..................... H05B 33/0818 323/210
2013/0187567 A1 * 7/2013 Li ...................... H05B 33/0815 315/297
2013/0193877 A1 * 8/2013 Kuo ................... H05B 33/0815 315/307
2013/0278145 A1 * 10/2013 Lin .................... H05B 33/0851 315/122
2014/0265900 A1 * 9/2014 Sadwick ............ H05B 33/0803 315/200 R
2016/0057825 A1 * 2/2016 Hu ..................... H05B 33/0815 315/201
2016/0088697 A1 * 3/2016 Yan .................... H05B 33/0818 315/205
2016/0363308 A1 * 12/2016 Shum .................. H05B 33/089
2018/0279429 A1 * 9/2018 Sadwick ............... H05B 33/08

* cited by examiner

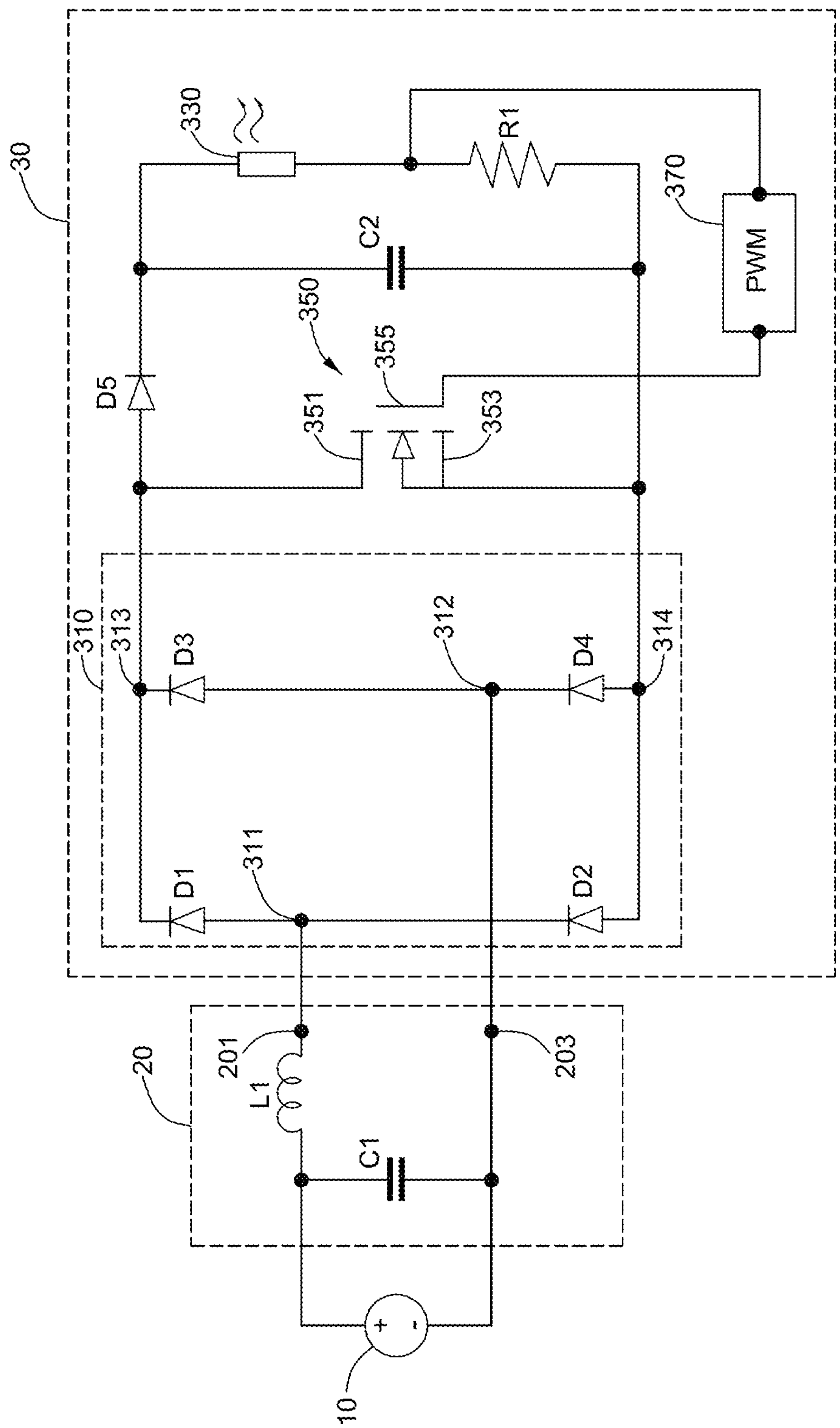
30
330
R1
370
C2
PWM
350
355
D5
351
353
310
313
D3
312
D4
314
311
D1
D2
20
201
203
L1
C1
10

LED LAMP AND DRIVER CIRCUIT FOR LED LIGHT SOURCE

TECHNICAL FIELD

The present invention relates to the field of lighting technology, in particular to both an LED lamp adapted to work in a circuit that contains a magnetic ballast, and a driver circuit that will enable an LED light source to function on the power supplied by the magnetic ballast.

BACKGROUND

With the development of solid-state lighting technologies, light-emitting diodes (LEDs) have become the preferred solution in many lighting projects, as they are highly efficient, environmentally friendly, have long service lives, and save energy. Consequently, they are increasingly used in lighting products. Generally, an LED lamp comprises a light source and a driver circuit composed of an LED array. The driver circuit converts the power supply to a direct current that is required for the LED light source to emit light.

Today, fluorescent lamps are gradually being eliminated. To replace them, more and more users are using LED lamps. However, since fluorescent lamps are generally driven by a magnetic or electronic ballast, after the fluorescent lamp is removed from a lamp, the magnetic or electronic ballast is still present in the lamp. Consequently, an LED lamp cannot be mounted directly in a circuit that contains a magnetic or electronic ballast.

When an LED lamp is used to replace a fluorescent lamp that uses a magnetic ballast, that is, when the LED lamp is to be mounted in a circuit that contains a magnetic ballast, since the power of an LED light source is generally less than that of the original fluorescent lamp, if the LED lamp is mounted directly, the inductive current and capacitance current in the magnetic ballast do not match, and the system power factor is reduced. This results in an excessively large input current that exceeds the current limit of the magnetic ballast, thereby creating a safety hazard. Therefore, there is a need for an improved LED lamp and corresponding driver circuit that can solve at least one of the aforementioned problems.

SUMMARY OF THE INVENTION

One aspect of the present invention provides an LED lamp adapted to work in a circuit that contains a magnetic ballast. The LED lamp comprises: a bridge rectifier for converting the alternating current supplied by the magnetic ballast into a direct current, the bridge rectifier having a first input terminal, a second input terminal, a first output terminal, and a second output terminal, where the first and second input terminals are electrically connected to the magnetic ballast; a filter capacitor electrically connected to the first and second output terminals of the bridge rectifier; an LED light source electrically connected to the first and second output terminals of the bridge rectifier; a transistor that has a drain electrode, a source electrode, and a gate electrode, the drain electrode and source electrode being electrically connected to the first and second output terminals of the bridge rectifier respectively; and a pulse width modulation controller electrically connected to the gate electrode of the transistor, and configured to control the turning on and off of the transistor.

Another aspect of the present invention provides a driver circuit for an LED light source to function on the power supplied by a magnetic ballast. The driver circuit comprises: a bridge rectifier for converting the alternating current supplied by the magnetic ballast into a direct current, the bridge rectifier having a first input terminal, a second input terminal, a first output terminal, and a second output terminal, where the first and second input terminals are electrically connected to the magnetic ballast; a filter capacitor electrically connected to the first and second output terminals of the bridge rectifier; a transistor that has a drain electrode, a source electrode, and a gate electrode, the drain electrode and source electrode being electrically connected to the first and second output terminals of the bridge rectifier respectively; and a pulse width modulation controller electrically connected to the gate electrode of the transistor, and configured to control the turning on and off of the transistor.

The LED lamp of the present invention can be directly mounted in a lamp that contains a magnetic ballast. This can replace a fluorescent lamp originally driven by a magnetic ballast. By controlling the turning on and off of a transistor, the inductive current is increased to match the capacitance current. Consequently, the system is in a resistive mode. Therefore, the system power factor increases, and the input current can be stabilized at a lower value.

BRIEF DESCRIPTION OF THE DRAWINGS

The present invention is further described below with references made to the accompanying drawings and specific embodiments.

FIG. 1 is a schematic circuit diagram of an embodiment of an LED lamp according to the present invention.

PREFERRED EMBODIMENTS

The following is a detailed description of the preferred embodiments of the present invention. Unless otherwise defined, the technical and scientific terms used herein are as they are usually understood by those skilled in the art to which the present invention pertains. “First”, “second”, and similar words used herein do not denote any order, quantity, or importance, but are merely intended to distinguish between different constituents. The terms “one”, “a”, and similar words are not meant to indicate a limit on quantity, but rather denote the presence of at least one. The term “or” does not denote exclusiveness, but refers to presence of at least one of the mentioned items (such as ingredients), and includes a situation where a combination of the mentioned items exists. “Comprise”, “include”, “have”, “contain”, and similar terms are meant to encompass the items listed thereafter and equivalents thereof as well as other additional items.

The approximate language used herein can be used for quantitative expressions, indicating that there is a certain amount of variation that can be allowed without changing the basic functions. Thus, numerical values that are corrected by language such as “approximately” or “about” are not limited to the exact value itself. In addition, in the expression “from approximately the first value to the second value”, “approximately” simultaneously corrects both the first value and the second value. In some cases, the approximate language may be related to the accuracy of the measuring instruments. The numerical values mentioned herein include all values that increase by unit from low to high, where it is assumed that any lower value and higher value are separated by at least two units.

An embodiment of the present invention relates to an LED lamp adapted to work in a circuit that contains a magnetic ballast. The LED lamp comprises a bridge rectifier, a filter capacitor, an LED light source, a transistor, and a pulse width modulation controller. The bridge rectifier is configured to convert the alternating current supplied by the magnetic ballast into a direct current, the bridge rectifier having a first input terminal, a second input terminal, a first output terminal, and a second output terminal, where the first and second input terminals are electrically connected to the magnetic ballast. The filter capacitor is electrically connected to the first and second output terminals of the bridge rectifier. The LED light source is electrically connected to the first and second output terminals of the bridge rectifier. The transistor has a drain electrode, a source electrode, and a gate electrode, the drain electrode and source electrode being electrically connected to the first and second output terminals of the bridge rectifier respectively. The pulse width modulation controller is electrically connected to the gate electrode of the transistor, and configured to control the turning on and off of the transistor.

Generally, the magnetic ballast comprises an inductor and a capacitor. In some cases, the magnetic ballast comprises only an inductor. The LED lamp in the embodiment of the present invention can be applied to the above two kinds of magnetic ballast.

Preferably, the transistor should be a metal-oxide-semiconductor field-effect transistor (MOSFET).

In some embodiments, the LED lamp also comprises a diode. The diode has an anode and a cathode. The anode is electrically connected to the first output terminal of the bridge rectifier and the drain electrode of the transistor. The cathode is electrically connected to the filter capacitor and the LED light source.

In some embodiments, the LED lamp also comprises a resistor connected to the LED light source in series.

In some embodiments, the pulse width modulation controller is adjusted according to the power of the LED light source and the power factor requirements of the system to control the turning on and off of the transistor.

In some embodiments, the pulse width modulation controller is electrically connected to the LED light source to detect the current flowing through the LED light source and to control the turning on and off of the transistor according to the detected current.

FIG. 1 shows a schematic circuit diagram of an embodiment of an LED lamp according to the present invention. As shown in FIG. 1, in this embodiment, an LED lamp 30 is mounted in a circuit that contains a magnetic ballast 20, and a power source 10 supplies power to the LED lamp 30. The magnetic ballast 20 comprises a capacitor C1 and an inductor L1, and has two output terminals 201 and 203. The capacitor C1 is connected in parallel between the positive and negative poles of the power source 10. The inductor L1 is connected in series between the positive pole of the power source 10 and the output terminal 201 of the magnetic ballast 20.

The LED lamp 30 comprises a bridge rectifier 310, a filter capacitor C2, an LED light source 330, a transistor 350, and a pulse width modulation controller 370. The bridge rectifier 310 is configured to convert the alternating current supplied by the magnetic ballast 20 into a direct current, the bridge rectifier 310 having a first input terminal 311, a second input terminal 312, a first output terminal 313, a second output terminal 314, and four diodes D1, D2, D3, and D4, where the first and second input terminals 311 and 312 are electrically connected to the two output terminals 201 and 203 of the magnetic ballast 20 respectively, and the four diodes D1, D2, D3, and D4 are connected to form a bridge structure. The filter capacitor C2 is electrically connected between the first and second output terminals 313 and 314 of the bridge rectifier 310. The LED light source 330 comprises a plurality of LEDs connected in series or in parallel, and is electrically connected between the first and second output terminals 313 and 314 of the bridge rectifier 310. In the embodiment shown in FIG. 1, the transistor 350 is a MOSFET. The MOSFET 350 comprises a drain electrode 351, a source electrode 353, and a gate electrode 355, where the drain electrode 351 and source electrode 353 are electrically connected to the first and second output terminals 313 and 314 of the bridge rectifier 310 respectively, and the gate electrode 355 is electrically connected to the pulse width modulation controller 370.

In some embodiments, the pulse width modulation controller 370 is further electrically connected to the LED light source 330 to detect the current flowing through the LED light source 330 and to control the turning on and off of the transistor 350 according to the detected current.

In some embodiments, the LED lamp 30 also comprises a diode D5. The anode of the diode D5 is electrically connected to the first output terminal 313 of the bridge rectifier 310, and the cathode of the diode D5 is electrically connected to the LED light source 330. The diode D5 is used to isolate low ripple currents from high ripple currents.

In some embodiments, the LED lamp 30 also comprises a resistor R1. The resistor R1 is connected in series with the LED light source 330. The series combination formed by the two is electrically connected between the first and second output terminals 313 and 314 of the bridge rectifier 310, and is connected in parallel with the filter capacitor C2. The resistor R1 is used to keep the current flowing through the LED light source 330 constant.

In some embodiments, the magnetic ballast 20 comprises only an inductor L1 that is electrically connected to the power supply 10. The LED lamp 30 of the present invention is adapted to work in a circuit that contains such a magnetic ballast.

In the LED lamp 30, the pulse width modulation controller 370 controls the turning on and off of the transistor 350. By doing so, the inductive current of the magnetic ballast 20 is increased to match the capacitance current. Consequently, the system is in a resistive mode. Therefore, the system power factor increases, and the input current flowing through the inductor L1 can be stabilized at a lower value.

An embodiment of the present invention also comprises a driver circuit. As shown in FIG. 1, the driver circuit of the present invention enables the LED light source 330 to function on the power supplied by the magnetic ballast 20. In one embodiment, the driver circuit comprises: a bridge rectifier 310 for converting the alternating current supplied by the magnetic ballast 20 into a direct current, the bridge rectifier 310 having a first input terminal 311, a second input terminal 312, a first output terminal 313, and a second output terminal 314, where the first and second input terminals 311 and 312 are electrically connected to the two output terminals 201 and 203 of the magnetic ballast 20; a filter capacitor C2 electrically connected to the first and second output terminals 313 and 314 of the bridge rectifier 310; a transistor 350 that has a drain electrode 351, a source electrode 353, and a gate electrode 355, the drain electrode 351 and source electrode 353 being electrically connected to the first and second output terminals 313 and 314 of the bridge rectifier 310 respectively; and a pulse width modulation controller 370 electrically connected to the gate electrode 355 of the transistor 350, and configured to control the turning on and off of the transistor 350.

Example 1

In example 1, a circuit that contains a magnetic ballast is used for the experiment. The magnetic ballast in the experimental circuit is a Philips product with the model number H-1B13-TP-W. This experiment comprises a comparative example and an experimental example. In the experimental example, the LED lamp 30 shown in FIG. 1 is mounted in a circuit that contains the aforementioned magnetic ballast. In the comparative example, compared with the LED lamp 30 in FIG. 1, the LED lamp used does not comprise the MOSFET 350 and the pulse width modulation controller 370. Other structures are the same as those in the LED lamp 30 in FIG. 1. Specific experimental data is shown in Table 1.

TABLE 1

| | Input voltage (V) | Input current (mA) | Input power (W) | Power factor |
|---|---|---|---|---|
| Comparative example | 120 | 220 | 10.5 | 0.4 |
| Experimental example | 120 | 120 | 2.5 | 0.97 |

It can be seen from Table 1 that, compared with an LED lamp that does not include a MOSFET and a pulse width modulation controller, the LED lamp in the embodiments of the present invention is mounted in a circuit that comprises a magnetic ballast, the power factor of the circuit is improved, and the input current decreases.

The description uses specific embodiments to describe the present invention, including the best mode, and can help any person skilled in the art perform experimental operations. These operations include using any device and system and using any specific method. The patentable scope of the present invention is defined by the claims, and may include other examples that occur in the art. Other examples are considered to be within the scope of the claims of the invention if they are not structurally different from the literal language of the claims or they have equivalent structures as described in the claims.

What we claim is:

1. An LED lamp adapted to work on a circuit having a magnetic ballast, wherein the magnetic ballast comprises an inductor and a capacitor, the LED lamp comprising:

a bridge rectifier for converting an alternating current supplied by the magnetic ballast to a direct current, the bridge rectifier having a first input terminal, a second input terminal, a first output terminal and a second output terminal, wherein the first input terminal and the second input terminal are electrically connected to the magnetic ballast;

a filter capacitor electrically connected to the first output terminal and the second output terminal of the bridge rectifier;

an LED light source electrically connected to the first output terminal and the second output terminal of the bridge rectifier;

a transistor having a drain electrode, a source electrode and a gate electrode, the drain electrode and the source electrode being electrically connected to the first output terminal and the second output terminal of the bridge rectifier respectively; and a pulse width modulation controller electrically connected to the LED light source to detect a current flowing through the LED light source and electrically connected to the gate electrode of the transistor, and configured to control on and off of the transistor to place the circuit in a resistive mode, the on and off control based on a pulse width modulation adjusted according to a power of the LED light source and a system power factor requirement.

2. The LED lamp of claim 1, wherein the transistor is a metal oxide semiconductor field effect transistor.

3. The LED lamp of claim 1, further comprising a diode having an anode and a cathode, the anode being connected to the first output terminal of the bridge rectifier and the drain electrode of the transistor, the cathode being connected to the filter capacitor and the LED light source.

4. The LED lamp of claim 1, further comprising a resistor electrically connected to the LED light source in series.

5. The LED lamp of claim 1, wherein the pulse width modulation controller is electrically connected to the LED light source for detecting a current flowing through the LED light source.

6. A driver circuit for an LED light source to function on a power from a magnetic ballast, the driver circuit comprising:

a bridge rectifier for converting an alternating current supplied by the magnetic ballast to a direct current, the bridge rectifier having a first input terminal, a second input terminal, a first output terminal and a second output terminal, wherein the first input terminal and the second input terminal are electrically connected to the magnetic ballast;

a filter capacitor electrically connected to the first output terminal and the second output terminal of the bridge rectifier;

a transistor having a drain electrode, a source electrode and a gate electrode, the drain electrode and the source electrode being electrically connected to the first output terminal and the second output terminal of the bridge rectifier respectively; and a pulse width modulation controller electrically connected to the LED light source to detect a current flowing through the LED light source and electrically connected to the gate electrode of the transistor, and configured to control on and off of the transistor to place the driver circuit in a resistive mode, the on and off control based on a pulse width modulation adjusted according to a power of the LED light source and a system power factor requirement.

7. The circuit of claim 6, wherein the magnetic ballast comprises an inductor and a capacitor.

* * * * *